US 6,588,233 B2

(12) United States Patent
Nattermann

(10) Patent No.: US 6,588,233 B2
(45) Date of Patent: Jul. 8, 2003

(54) METHOD FOR PHYSICAL REFINEMENT OF A GLASS MELT

(75) Inventor: Kurt Nattermann, Ingelheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/080,457

(22) Filed: Feb. 22, 2002

(65) Prior Publication Data

US 2002/0112507 A1 Aug. 22, 2002

Related U.S. Application Data

(62) Division of application No. 09/312,010, filed on May 14, 1999, now Pat. No. 6,401,492.

(30) Foreign Application Priority Data

May 19, 1998 (DE) .......................................... 198 22 437

(51) Int. Cl.[7] ................................................ C03B 5/00
(52) U.S. Cl. .................... 65/134.2; 65/134.1; 65/134.9; 65/135.1
(58) Field of Search ............................... 65/347, 134.1, 65/134.2, 134.9, 346, 135.1

(56) References Cited

U.S. PATENT DOCUMENTS

| | | | |
|---|---|---|---|
| 1,645,080 A | | 10/1927 | Watson |
| 2,635,388 A | * | 4/1953 | Peyches et al. ............... 65/347 |
| 2,686,820 A | * | 8/1954 | Arbeit et al. ................. 65/347 |
| 4,195,982 A | | 4/1980 | Coucoulas |
| 4,316,734 A | * | 2/1982 | Spinosa et al. ............. 65/134.9 |
| 4,685,946 A | * | 8/1987 | Derks et al. .................. 65/401 |
| 4,693,740 A | * | 9/1987 | Noiret et al. ................. 65/347 |
| 4,738,938 A | | 4/1988 | Kunkle et al. |
| 4,794,860 A | | 1/1989 | Welton |
| 4,820,329 A | | 4/1989 | Guenthner |

(List continued on next page.)

FOREIGN PATENT DOCUMENTS

| | | |
|---|---|---|
| CH | 290 825 A | 5/1953 |
| DE | 310 134 C | 12/1913 |

(List continued on next page.)

OTHER PUBLICATIONS

Patent Abstract of Japan vol. 1995, No. 2, Mar. 31, 1995 & JP 06 305735, Nov. 1, 1994.

(List continued on next page.)

Primary Examiner—James Derrington

(57) ABSTRACT

In many engineering production processes, for example glass or glass-ceramic manufacturing processes, liquids, such as glass melts, participate in the processes in which gases are dissolved, which in part form bubbles in the liquid. So that the quality of the final product is not disadvantageously influenced, the liquid, e.g. glass melt, should be refined to remove the bubbles. According to the method of the invention an overpressure acting on the liquid is provided which is such that the internal pressure in the bubbles immediately under the surface of the liquid in a refining chamber is at least as great as the sum of equilibrium pressures of the gases dissolved in the liquid and the sum of the vapor pressure of components evaporating from the liquid. A two stage apparatus is provided which performs a preferred embodiment of the refining method of the invention. This two stage apparatus includes a tower-like comparatively higher low pressure refining chamber (6) and a downstream comparatively lower overpressure refining chamber (1).

10 Claims, 2 Drawing Sheets

U.S. PATENT DOCUMENTS

| | | | |
|---|---|---|---|
| 4,849,004 A | 7/1989 | Schwenninger | |
| 4,886,539 A | 12/1989 | Gerutti et al. | |
| 4,919,697 A | 4/1990 | Pecoraro et al. | |
| 4,919,700 A | 4/1990 | Pecoraro et al. | |
| 4,921,521 A | * 5/1990 | Kremenets | 65/347 |
| 5,665,137 A | 9/1997 | Huang | |

FOREIGN PATENT DOCUMENTS

| | | |
|---|---|---|
| DE | 25 39 355 A | 7/1977 |
| EP | 0 257 238 B1 | 10/1989 |
| EP | 0 775 671 A | 5/1997 |
| FR | 519 982 A | 6/1921 |
| FR | 659 888 A | 7/1929 |
| FR | 1 0101 123 A | 6/1952 |

OTHER PUBLICATIONS

Patents Abstract of Japan, vol. 17, No. 647, Dec. 2, 1993 & JP 50 208830 A, Aug. 20, 1993.

E.D. Spinosa et al.: "Sonic Energy as a Means to Reduce Energy . . . " Ceramic Engineering & Science Proceedings, vol. 7, No. 3/4, 1986, pp. 410–425.

Patent Abstracts of Japan, vol. 17, No. 647, Dec. 2, 1993 & JP 05 208845 A, Aug. 20, 1993.

* cited by examiner

METHOD FOR PHYSICAL REFINEMENT OF A GLASS MELT

This application is a divisional of Ser. No. 09/312,010, filed May 14, 1999, now U.S. Pat. No. 6,401,492.

BACKGROUND OF THE INVENTION

1. Field of the Invention

The present invention relates to a process for physical refinement of a liquid, especially a glass melt, which has dissolved gases and bubble-shaped gas inclusions, by varying the pressure on the liquid in a refining chamber.

The present invention also relates to an apparatus for physical refinement of a liquid, which has dissolved gases and bubble-shaped gas inclusions, with at least one processing container for treatment of the liquid and with at least one refining chamber in which there is a change of the pressure exerted on the liquid relative to the pressure in the processing container.

2. Prior Art

Liquids in which gases are dissolved, which, in part, form bubbles in the liquids, are participants in many engineering processes. Since these gases or gas bubbles can interfere with further processing or impair the properties and thus the quality of the manufactured product disadvantageously, it is necessary to free the liquid from these gas bubbles. This priority is designated as degassing or refinement.

In the following the refinement of a glass melt is used as an example of the refinement of a liquid in general, but the invention should not be limited here to that example. The analogous problem arises in many engineering applications.

As a result of the decomposition of the starting materials in the initial batch considerable amounts of gases are generated during the melting of glass. As a crude estimate it is said that about 1 kg of glass results from melting 1.2 kg of batch, i.e. during the melting about ⅕ of the batch weight is released in the form of gas. Other gases physically accompany the batch or starting mixture or are introduced by the combustion heat source used in the glass melting process.

Most gases escape of course during the initial melting of the glass, however a considerably portion of the gases are entrapped in the melt. A portion of the trapped gases is dissolved in the glass melt, while the other portion remains as local gas inclusions, as so-called bubbles, in the melt. The bubbles shrink or grow when the bubble internal pressure is higher or lower than the equilibrium pressure of the dissolved gas. The gas bubbles have different sizes.

Since these gas bubbles disadvantageously impair the quality of a glass or glass-ceramic body made from the glass melt, the glass melt must be refined of the gas, i.e. which means that the gas must be removed from the glass melt.

The term "refining of the glass" means a melt process step subsequently connected with the melting in the so-called refining chamber, which

- largely results in a removal of a definite size class of gas bubbles and
- guarantees a desired adjustment of the gas content of the glass melt and at the same time
- is integrated in a complex sequence of melting process steps.

The refining of the glass is then of highest significance for the quality of the product resulting from the melting process. A variety of methods have been used in the prior art for the refining.

The gas bubbles have the tendency to rise in the melt and to escape from containment into the surroundings because of their static buoyancy. This process however requires considerable time without external influence, which would be costly for the production process because of the long idle time. It is thus known to provide higher temperatures in a refining zone in order to increase the viscosity of the melt and thus the rising speed and bubble diameter of the gas bubbles. This additional temperature rise requires a considerable amount of energy, which adds comparatively large additional costs to the production process.

The methods of chemical refining of glass with oxides by means of temperature-dependent oxidation steps are well tested and largely optimized. These methods especially involve refining agents such as NaCl, Sb(V)-oxide, As(V)-oxide and Sn(IV)-oxide.

During chemical refining especially the rising speed of smaller bubbles is increased because the refining gas $O_2$ that is generated from the refining agent is pumped into them.

Chemical refining methods comprise a sequence of elementary steps interwoven with each other in time and space. The finely dispersed bubbles in the crude melt are expanded to such a great extent by the refining gas $O_2$ that a drastic shortening of the rising time occurs. Simultaneously the refined bubbles extract gas dissolved in the glass. In subsequent cooling steps as complete as possible a resorption of the unavoidable remaining bubbles occurs. Among others, satisfactory color, water-content and concentration limits of $O_2$ and $SO_2$ are major goals for a successful control of the gas content of the glass. A once-achieved satisfactory bubble quality may not be impaired again during cooling or shaping processes.

Chemical refining has several disadvantages in principle limiting it:

- the method does not function for every glass system, especially in NaCl refining, or only at higher temperatures;
- the refining process requires much time, since gas diffusion occurs slowly in the melt. Because of that the refining chambers must have a comparatively large extent which increases the production costs;
- the refining agents change the chemistry of the glass and thus its properties; furthermore they are toxic (arsenic, antimony).

Because of these disadvantages the so-called physical refining processes were introduced which do not disadvantageously change the glass chemistry. The physical refining of the glass melt is based on "forcing" the bubbles with physical methods to climb to the surface of the melt. The bubbles then burst at the surface and release their gas content or dissolve in the melt.

The so-called low pressure refining is a physical refining method in wide spread use, which is described in numerous literature references, for example in U.S. Pat. No. 4,738,938 and European Patent Document EP 0 231 518 B1.

In low pressure refining the bubbles present in the melt grow when the equilibrium pressure on the gas dissolved in the melt drops below their internal pressure (hydrostatic pressure in the melt plus the surface tension pressure of the bubble). Because of that the bubbles become larger, growing more rapidly at the surface of the melt, bursting there or are "skimmed off". The growth speed is determined primarily by melt-bubble gas transport.

The prior art methods of low pressure refining has the following disadvantages in principle limiting them:

a) The growth speed of the bubbles is primarily determined by gas diffusion and by the equilibrium pressure of the gas dissolved in the melt; low pressure refining operates only economically then, i.e. sufficiently rapidly, when additional chemical refining agents are used. Thus low pressure refining usually does not permit the complete abandonment of chemical refining agents, but allows only a gradual reduction of the chemical refining agents. Thus U.S. Pat. Nos. 4,886,539, 4,919,697 and 4,919,700 describe a method for vigorous bubbling of glass melts at low pressure for removal of gas ingredients.

b) Furthermore low pressure refining is based on the rise of bubbles to the surface of the melt. Thus the viscosity of the melt must be sufficiently low or its temperature must be sufficiently high. Glass melts being refined at refining conditions usually have a viscosity of definitely less than 10 Pas, which means that the associated temperatures of the glass melts must certainly be over 1400° C., in special glasses definitely over 1500° C.; low pressure refining requires a comparatively large-surface and long refining chamber and a comparatively long refining time, which disadvantageously effects production costs.

c) Small bubbles grow only very slowly during low pressure refining and mainly do not climb to the surface of the melt. All the bubbles are hardly removed from the melt by low pressure refining, furthermore only the bubble spectrum in the melt (gross dispersion of bubbles) changes. The engineering goal is then to beneficially transform the bubble spectrum. A complete debubbling or bubble removal from the melt is thus hardly possible.

d) If the hydrostatic pressure falls below the equilibrium pressure of the dissolved gas, a very vigorous spontaneous bubble formation, i.e. a foam is formed, which is to be removed in an additional process step. Thus U.S. Pat. No. 4,794,860, which corresponds to European Patent Document 0 253 188, describes a process in which the foam or froth arising in a glass melt under low pressure is collapsed by addition of foam-breaking substances, such as water, alkali metal compounds, or solutions of NaOH or carbonates. European Patent Document EP 0 257 238 B1 describes a method in which the foam is collapsed by additional heating of a region in the melt container above the melted material. U.S. Pat. No. 4,849,004 describes a method in which a glass melt at low pressure is exposed to additional periodic pressure oscillations (<1 s duration for a pulse, 10 . . . 60 s duration for the total pulse train) in order to collapse the foam. All these measures increase the cost of the manufacturing process and disadvantageously effect the glass chemistry in the above-named references.

e) The process parameters for the low pressure refining depend sensitively on the equilibrium pressure of the gas dissolved in the melt. The low pressure refining with stable process parameters requires the use of expensive raw material with uniform quality.

f) In low pressure refining a strong evaporation of components of the melt occurs. Because of that under certain circumstances the pumps are strongly loaded or the composition of the melt changes. A temporary out flow can even occur at high vapor pressure, which is very unfortunate.

SUMMARY OF THE INVENTION

It is an object of the present invention to provide a process of the above-described kind and an associated apparatus so that the concerned liquid can be refined in a simple manner with almost complete or even total avoidance of chemical refining agents, so that the refining is also effective in liquids with comparatively high viscosity, such as glass melts at comparatively lower temperatures than have been possible in prior art methods and that the refining time is comparatively shorter than in prior art refining methods.

It is an additional object of the invention to provide a method and apparatus for physically refining a glass melt to eliminate dissolved gasses and gas bubbles without or with reduced usage of chemical refining agents.

According to the invention the liquid is acted on with an overpressure that is adjusted or set so that the internal pressure in the individual bubbles immediately under the surface of the liquid level in the refining chamber or containment chamber is at least as great as the sum of the equilibrium pressures of the gases dissolved in the liquid and the sum of the vapor pressures of the components evaporating from the liquid.

Because of the features of the invention a pressure is produced in the bubbles, which is above the equilibrium pressure of the gases dissolved in the liquid. Because of that the gases found in the bubbles are forced into the liquid, where they are rapidly dispersed by diffusion.

Overpressure refining is based on the concept that the forcing out of the bubbles (which would already occur because of the surface tension) is accelerated by means of the overpressure.

The methods according to the invention have a series of advantages:

by overpressure refining small bubbles can be immediately forced out, no spontaneous bubble formation (i.e. no foam) needs to be removed, the bubbles themselves in the comparatively high-viscosity liquid ($\eta$>about 1000 Pas) can be forced out at a sufficient pressure, the temperature of the liquid can be clearly less than e.g. in low pressure refining, the materials for the refining chamber are economical (conventional furnace block), the overpressure refining is self-stabilizing in the sense that the process conditions for the overpressure refining are usually improved with increasing depth in the liquid because the increasing hydrostatic pressure acts beneficially.

In principle, all bubbles can be forced out by the overpressure refining, i.e., the liquid, and also the glass melt, can be made (temporarily) bubble-free. In order to maintain the required overpressure and the associated features within certain limits, the process is guided or controlled so that the internal pressure in the bubbles immediately under the surface of the liquid level is at least about 0.01 MPa greater than the sum of the equilibrium pressures of the gases dissolved in the liquid and the sum of the vapor pressures of the components evaporating from the liquid.

Because of that, all bubbles are forced out whose radius is less than 1 mm which is sufficient for most applications.

In order to attain a sufficient refining the process according to the invention is controlled so that the duration of the overpressure application amounts to at least 60 s.

The process of overpressure refining also functions when the liquid already has a viscosity of more than 10 Pas in the refining chamber. The process is controlled so that the viscosity of the liquid does not drop below 10 Pas, since otherwise bubbles can again be released.

It is understandable that overpressure refining removes no gas from the liquid, even under conditions in which the equilibrium pressure of the dissolved gases increases. One must thus prevent the dissolved gas from later forming new bubbles.

According to a further embodiment of the process according to the invention this occurs because the liquid is cooled during the action of the overpressure so that its viscosity grows so that a spontaneous bubble generation is prevented after ending of the compression process.

This has the following advantages:
the viscosity of the liquid decreases as the temperature rises which at the same time reduces the formation of new bubbles, and
the solubility of the gases in the liquid increases and thus the equilibrium pressure drops because of the temperature decrease.

In order to remove the large bubbles from the liquid, an additional refining step is connected with the overpressure refining in a further embodiment of the invention.

This step can be a chemical refining step. However preferably according to another embodiment of the invention a physical refining step comprising low pressure refining is provided because of the above-mentioned advantages of physical refining in comparison to chemical refining.

This two step refining, i.e. the combination of a low pressure refining and an overpressure refining, in which the liquid is acted on with a lower pressure and then with an overpressure has the advantage that the liquid is more highly refined or is provided with a higher refining degree without chemical influences:
in the first step the larger bubbles are removed from the melt; generally no bubbles survive and/or new small bubbles rise are spontaneously generated, and
in the second step the small bubbles are forced out by the overpressure refining.

The condition for optimum two step refining is that the equilibrium pressure of the dissolved gases (Pgg) is less than the normal pressure (Pn).

The change of the pressure exerted on the liquid can occur in different ways.

According to a first embodiment the method is performed so that the change of the pressure on the liquid is caused by a change in the hydrostatic pressure on the liquid.

This step can be performed in a comparatively simple manner by means of appropriate geometric design features of the refining chamber.

According to another embodiment of the invention the process is performed so that pressure changes are caused in the liquid by generating sound waves in the liquid.

The refining of the liquid in a sonic field is a very efficient way to bring about overpressures and low pressure conditions in the liquid to physically influence the bubble spectrum.

The above object of the invention is similarly attained in an apparatus according to the invention comprising a refining chamber arranged between two processing vessels. The refining chamber is lowered relative to the normal liquid level in the processing vessels so that a higher hydrostatic pressure exists in it than in the processing vessels. It is at least arranged at a height or level (A) below the one upstream processing vessel so that the internal pressure in the bubbles immediately under the surface of the liquid level in the refining chamber is at least as great as the sum of the equilibrium pressures of the gases dissolved in the liquid and the sum of the vapor pressures of the components evaporating from the liquid.

An apparatus of this type provides an effective overpressure refinement of the liquid with a comparatively simple structure.

According to an additional embodiment of the invention the apparatus is advantageously formed so that the lowered refining chamber for overpressure refining is connected in series to a tower-like elevated refining chamber for low pressure refining.

This combination allows an especially effective refining. When the liquid is acted on in the first chamber with a lower pressure, the large bubbles at the surface climb or rise and are destroyed or skimmed off there. Subsequently in the second chamber the liquid is acted on with an overpressure, so that a pressure in the bubbles in the liquid is produced which is above the equilibrium pressure of the gas dissolved in the liquid. Because the gases in the small bubbles are forced into the liquid, they are rapidly dispersed by diffusion. At a sufficient pressure on the liquid the bubbles themselves can still be refined at a high viscosity of the liquid
($\eta$>1000 Pas).

To perform sonic refining the refining chamber of the apparatus according to one embodiment of the invention has an appropriate sonotrode for generating sound waves in the liquid in the refining chamber that allows the production of an effective sonic field.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
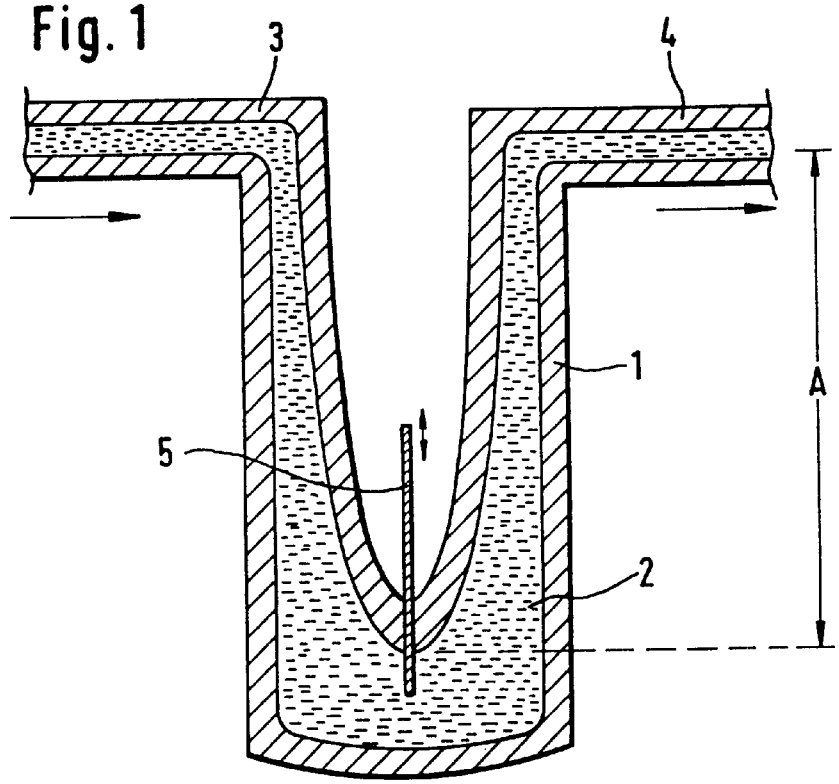
FIG. 1 is a diagrammatic cross-sectional view of a refining chamber for overpressure refining of a liquid, especially a glass melt, according to the invention.

FIG. 1 is a schematic longitudinal cross-sectional view through a refining chamber for physical refining of a liquid, in the present embodiment a glass melt 2, which has dissolved gases therein and bubble-like gas inclusions, i.e. gas bubbles. The melt 2 flows from an upstream processing vessel P, a melt furnace, through the inlet 3 of the refining chamber 1 into the refining chamber 1 and then after the performance of the refining through the outlet 4 into an subsequently connected processing vessel P'. The height or level of the melt in the processing vessels as stated above determines the height of the inlet 3 and the outlet 4. The refining chamber 1 further has a vertically upward and downward movable control sword element 5 for control of the flow of the melt in the melt vessel.

For producing the overpressure, as illustrated, the refining chamber or vessel is arranged at a lower level relative to the normal level in the processing vessel so that a higher hydrostatic pressure exists in it than in the processing containers. The amount or depth A of the lowering is selected so that the internal pressure in the bubbles is at least as great as the sum of the equilibrium pressures of the gases dissolved in the melt and the sum of the vapor pressures of the components evaporating from the melt.

As already mentioned, no bubbles are forced out of the liquid by this overpressure refining.

Figure 2:
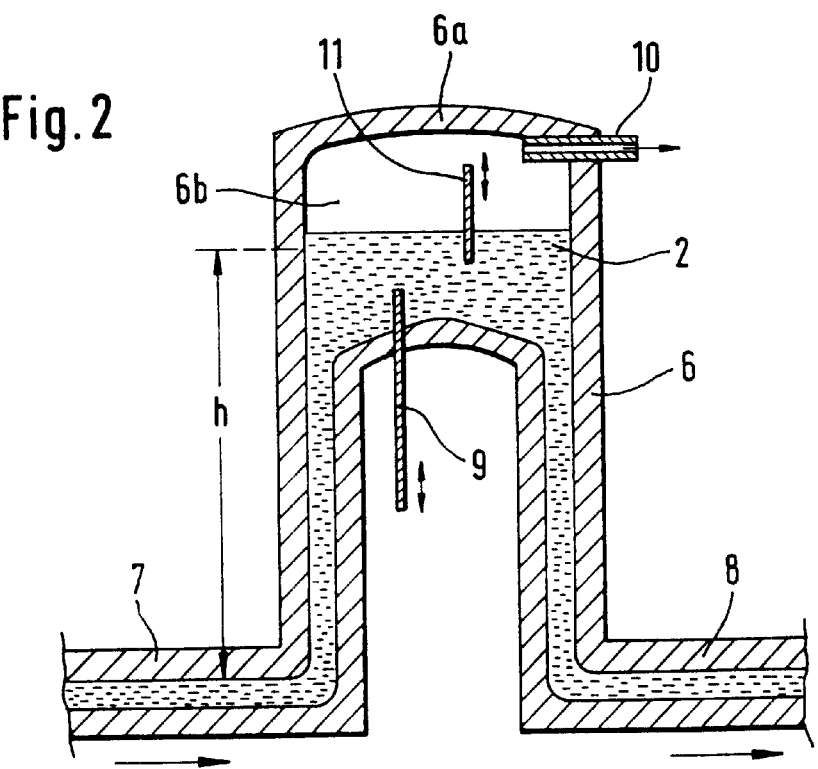
FIG. 2 is a diagrammatic cross-sectional view of a refining chamber for low pressure refining of a liquid, especially a glass melt.

FIG. 2 shows a tower-like or column-like low pressure purifying chamber 6 with an inlet 7 for the melt and an outlet 8, as well as a controlling sword element 9 for regulating the flow of the melt. A passage 10 is provided in an upper section of the purifying chamber 6, to which a vacuum pump is connectable in order to produce a reduced or low pressure in the space 6b above the liquid level of the melt 2 and below the top-side boundary 6a of the refining chamber. A bubble separator is also connected to this passage. A vertically movable mechanical bubble barrier is arranged in the space 6b above the melt, which particularly should prevent foam exposed on the liquid surface from reaching the next stage.

In the low pressure purification in the tower-like structure the hydrostatic pressure of the melt is similarly employed.

The outer pressure on the bubble at the depth h under the liquid surface is given by $$Pa = Pao - \rho \cdot g \cdot h$$

wherein $g=9.81$ m/s$^2$. For a melt with a density, e.g. $\rho=2500$ kg/m$^3$, a vacuum head of 4 m is sufficient in order to completely compensate for the surrounding pressure of $Pao=10^5$ Pa.

The low pressure refinement has the above-described effect, i.e. it predominantly causes a refinement of the large bubbles.

Figure 3:
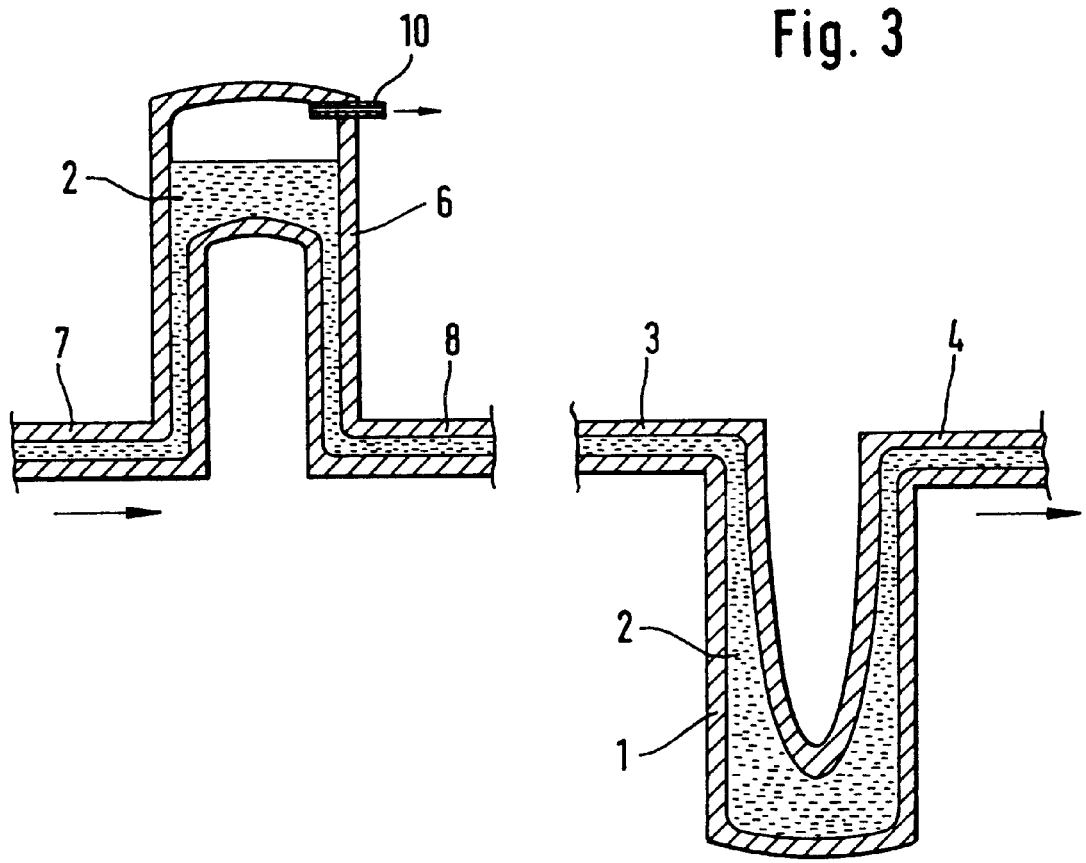
FIG. 3 is a diagrammatic cross-sectional view of an apparatus for performing a method of liquid refining according to a preferred embodiment of the invention, including a combination of the low pressure refining chamber according to FIG. 2 with a downstream overpressure refining chamber according to FIG. 1.

In FIG. 3 an apparatus is shown which combines the advantageous action of the overpressure refinement with that of the low pressure refinement, without which the disadvantages of the latter must be borne.

This apparatus comprises a low pressure refining chamber 6 according to FIG. 2 combined with the downstream overpressure refining chamber 1 of FIG. 1. The melt is first acted on with a low pressure and then with a high pressure in the apparatus shown in FIG. 3.

Because the melt 2 is first acted on with a low pressure large bubbles can rise to the surface and burst there or be skimmed off through the passage 10. Because the melt 2 is subsequently acted on with an overpressure, a pressure arises in the bubbles in the melt that is over the equilibrium pressure of the gases dissolved in the melt. Because of that the gases located in the small bubbles are forced into the liquid where they are dispersed rapidly by diffusion. With a sufficient pressure on the melt the bubbles themselves are refined at the high viscosity of the melt.

As has already been mentioned, fresh bubble formation in the refining chamber 1 can be prevented by lowering the temperature of the melt.

Figure 4:
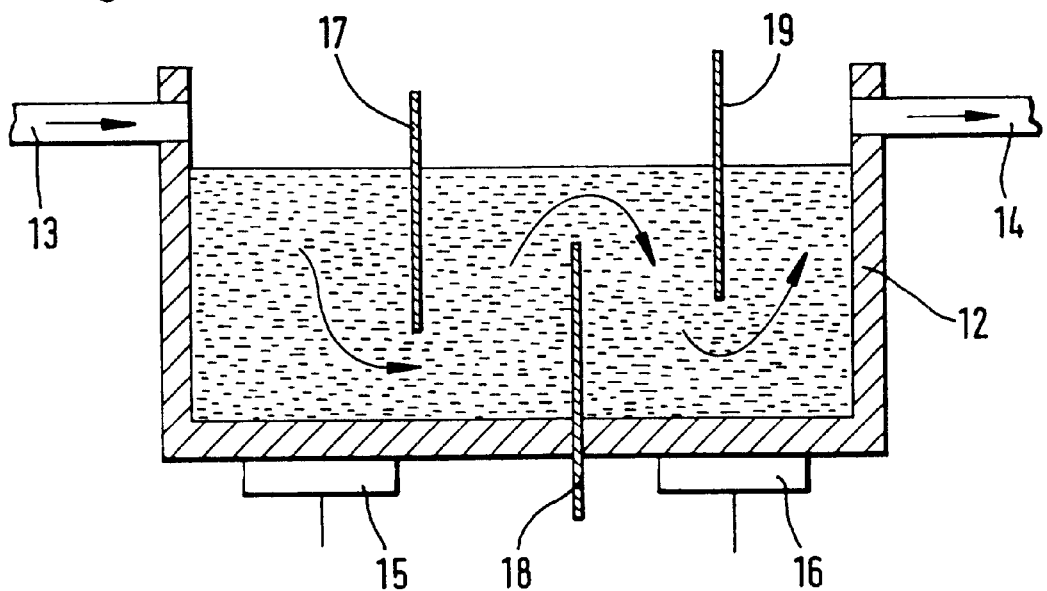
FIG. 4 is a diagrammatic cross-sectional view through an apparatus for performing a sonic refining of a liquid including a refining chamber.

In FIG. 4 an apparatus is shown diagrammatically which is provided for sonic refinement of the melt 2. It comprises a vessel 12 with an inlet 13 and an outlet 14, in which sonotrodes 15 and 16, also called sonic electrodes, are inserted, which generate sound waves in the melt 2.

The optimum sonic frequency is in the 1 to 10 kHz range and the sound intensities are <10 kW/m2.

Periodic variations in pressure are produced by the sonic field, as also can occur by rotary stirring. The sonic refining can be represented as a periodic or repeated overpressure refining/low pressure refining.

The pressure amplitude of the sound waves can increase the surrounding pressure several orders of magnitude, even at comparatively low sound intensities. By adjustment of the parameters of the sonic field (namely the frequency, chirp, intensity, effective duration) correctly the size of the bubbles and thus their refinement can be efficiently influenced.

For an efficient refinement it is necessary to couple the bubbles in the melt efficiently to the sonic field. It has been shown that mainly the bubbles whose resonance frequency corresponds closely to the resonance frequency of the sonic oscillation react with the sonic field. With a suitable chip (time varying frequency) of the sonic field a broad spectrum of bubbles can be refined.

With a sonic or sound wave generator that operates at a fixed frequency the bubble resonance frequency can be tuned to the sound frequency by varying the hydrostatic pressure on the bubbles. This can occur when the melt is guided through the refining chamber at different levels, e.g. by a division of the refining chamber according to FIG. 4 by the sword barrier elements 17, 18 and 19.

The disclosure in German Patent Application 198 22 437.043 of May 19, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process for physically refining a liquid, especially a melt, and apparatus for performing said process, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method for physical refining a glass melt containing dissolved gasses and gas bubbles and including components evaporating therefrom, said method comprising applying an overpressure to said glass melt having a magnitude selected so that an internal pressure in said bubbles immediately under a surface of the glass melt in a refining chamber is at least as great as a sum of equilibrium pressures of the gases dissolved in the glass melt and a sum of vapor pressures of the components evaporating from the glass melt;

wherein said overpressure is provided by a change in a hydrostatic pressure in said glass melt.

2. The method as defined in claim 1, wherein the internal pressure in said bubbles immediately under the surface of the glass melt is at least about 0.01 Mpa greater than said sum of the equilibrium pressures of the gases dissolved in the glass melt and said sum of the vapor pressures of the components evaporating from the glass melt.

3. The method as defined in claim 1, wherein said applying of said overpressure occurs for a duration of at least 60 s.

4. The method as defined in claim 1, wherein said glass melt is provided on introduction to said refining chamber with a viscosity of more than 10 Pas and said viscosity is controlled so that said viscosity is not below 10 Pas during the applying.

5. The method as defined in claim 4, further comprising cooling during the applying of the overpressure so that said viscosity of said glass melt increases so that a spontaneous generation of additional bubbles is prevented after said applying has ended.

6. The method as defined in claim 1, wherein said overpressure is selected so that only those of said bubbles having a radius of less than 1 mm are forced out.

7. The method as defined in claim 1, further comprising an additional refining step in which comparatively larger ones of said bubbles are removed from said glass melt.

8. The method as defined in claim 7, wherein said additional refining step is a chemical refining step.

9. The method as defined in claim 7, wherein said additional refining step is a low pressure refining step.

10. The method as defined in claim 1, wherein said change in said hydrostatic pressure is provided by arranging said refining chamber at a lower level relative to a level of a processing chamber supplying said glass melt to said refining chamber so that a depth of said refining chamber relative to said processing chamber is such that said internal pressure in said bubbles immediately under said surface of said glass melt in said refining chamber is at least as great as said sum of equilibrium pressures of the gases dissolved in the glass melt and said sum of vapor pressures of the components evaporating from the glass melt.

* * * * *